N. WHEELER & J. A. HOUSE.
CLUTCH-DEVICE.

No. 175,313. Patented March 28, 1876.

WITNESSES
Wm A. Skinkle
Wm J. Peyton

INVENTORS,
Nathaniel Wheeler.
James A. House.

By their Attorney
W. D. Baldwin

UNITED STATES PATENT OFFICE.

NATHANIEL WHEELER AND JAMES A. HOUSE, OF BRIDGEPORT, CONN., ASSIGNORS TO THE WHEELER & WILSON MANUFACTURING COMPANY, OF SAME PLACE.

IMPROVEMENT IN CLUTCH DEVICES.

Specification forming part of Letters Patent No. 175,313, dated March 28, 1876; application filed March 18, 1876.

*To all whom it may concern:*

Be it known that we, NATHANIEL WHEELER and JAMES A. HOUSE, both of Bridgeport, in the county of Fairfield and State of Connecticut, have invented certain new and useful Improvements in Clutch Devices, of which the following is a specification:

Our invention relates to a friction-clutch, for sewing-machines and other purposes, which may be thrown into or out of connection for driving or stopping the machine without interruption to the driving-power. Its object is to furnish a simple, efficient, and easily-manipulated device, which is especially desirable in power-driven machines.

To attain these ends we mount and key upon the driving-shaft of the machine a balance-wheel or pulley provided with a friction surface or recess, into which a driving-cone pulley, turning freely, and capable of an endwise movement upon the driving-shaft, is forced, by a suitable wedge, to establish a connection between it and the machine.

The subject-matter claimed will hereinafter be specified.

In the accompanying drawings our invention is shown as applied to a sewing-machine.

Figure 1:
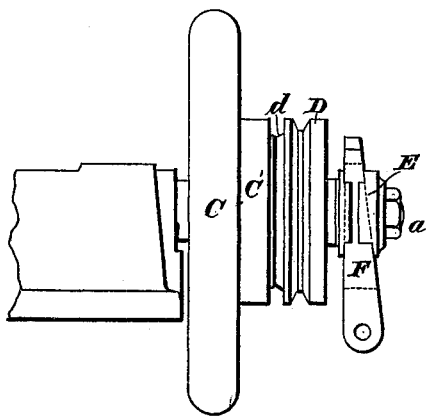
Figure 2:
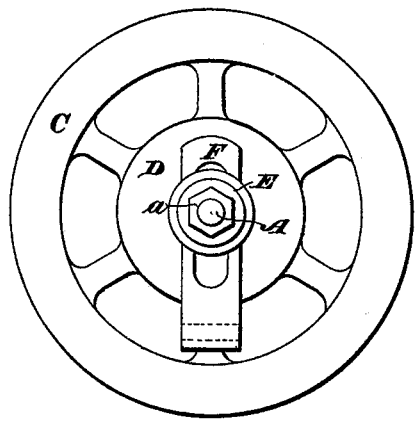
Figure 3:
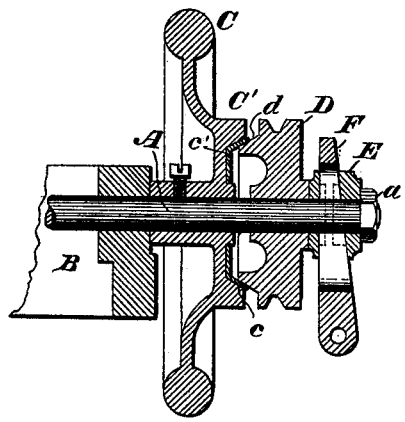

Figure 1 represents a view, in elevation, of so much of the machine as is necessary to illustrate the subject-matter herein claimed; Fig. 2, an end view thereof; and Fig. 3, a vertical longitudinal central section therethrough.

A shaft, A, mounted in suitable bearing in the frame B, carries a balance-wheel or pulley, C, keyed or secured thereon. The hub C' of this wheel is recessed on its face, as shown at c in Fig. 3, the recess being made flaring to receive a corresponding cone-shaped hub, d, of a driving-pulley, D.

We prefer to line the recess c of the balance-wheel with a packing, c', of rubber or other suitable material, to diminish the wear of the surfaces which come in frictional contact.

The pulley D is grooved for the reception of a driving band or belt, and turns freely, and is movable endwise upon the shaft A. It is controlled by means of a sectional expanding-ring, E, through which a wedge, F, moves endwise. The expanding-ring turns freely upon the shaft A, its outer section abutting against the nut a on said shaft, while its other abuts, when expanded, against the driving-pulley D. The wedge is slotted longitudinally, so as to inclose the driving-shaft, and moves freely endwise transversely to said shaft in grooves in the ring E, being controlled by a lever or treadle in any suitable way.

The withdrawal of the wedge releases the driving-pulley from frictional contact with the balance-wheel, and allows it to run loosely on its shaft without driving the machine, but when forced in the machine is driven by the frictional contact of the conical surface of the driving-pulley and the balance-wheel, as will be readily understood from an inspection of the drawing.

We claim as our invention—

The friction clutch hereinbefore described, consisting of the combination of the balance-wheel, its recessed hub, the cone driving-pulley fitting into said hub, the expanding-ring, and a wedge, all mounted upon the driving-shaft.

In testimony whereof we have hereunto subscribed our names.

NATHANIEL WHEELER.
JAMES ALFORD HOUSE.

Witnesses:
F. HURD,
A. R. LACEY.